United States Patent
Cominsky

[11] Patent Number: 5,967,553
[45] Date of Patent: Oct. 19, 1999

[54] BRACKET FOR MUD FLAPS AND SNOWPLOW DIVERTERS

[76] Inventor: James J. Cominsky, 3718 Ohio St., Perry, Ohio 44081

[21] Appl. No.: 08/931,467

[22] Filed: Sep. 16, 1997

Related U.S. Application Data

[63] Continuation-in-part of application No. 08/701,784, Aug. 26, 1996, Pat. No. 5,823,571.

[51] Int. Cl.$^6$ ....................................................... B62B 25/16
[52] U.S. Cl. ............................................. 280/847; 280/154
[58] Field of Search .................................... 280/847, 848, 280/851, 154

[56] References Cited

U.S. PATENT DOCUMENTS

| | | | |
|---|---|---|---|
| 3,158,386 | 11/1964 | Tillinghast et al. | 280/851 |
| 3,219,363 | 11/1960 | Dalsey | 280/851 |
| 3,224,791 | 12/1965 | Sogian | 280/847 |
| 3,285,624 | 11/1966 | Aber et al. | 280/847 |
| 3,700,260 | 10/1972 | Moore et al. | 280/851 |
| 4,323,262 | 4/1982 | Arenhold | 280/154.5 |
| 4,695,070 | 9/1987 | Knox | 280/851 |
| 4,856,816 | 8/1989 | Francis | 280/851 |
| 4,923,515 | 5/1990 | Williams | 280/851 |
| 5,044,667 | 9/1991 | Manning | 280/851 |
| 5,460,412 | 10/1995 | Wincent et al. | 280/851 |
| 5,486,079 | 1/1996 | Martin et al. | 411/392 |
| 5,823,571 | 10/1998 | Cominsky | 280/847 |

*Primary Examiner*—Richard M. Camby
*Attorney, Agent, or Firm*—Joseph H. Taddeo

[57] ABSTRACT

The present invention relates to a mud flap retainer device for attachment to the transverse, rearward facing support frame of a truck. The retainer device comprises a spring biased bracket constructed as a unitary, stainless steel piece, that incorporates releasability of the mud flap without destruction thereof, if the flap is pulled under a truck tire or is torn away by similar exceptional forces. The brackets are also useful for retaining snowplow diverters on the upper perimeter of a snowplow blade.

7 Claims, 8 Drawing Sheets

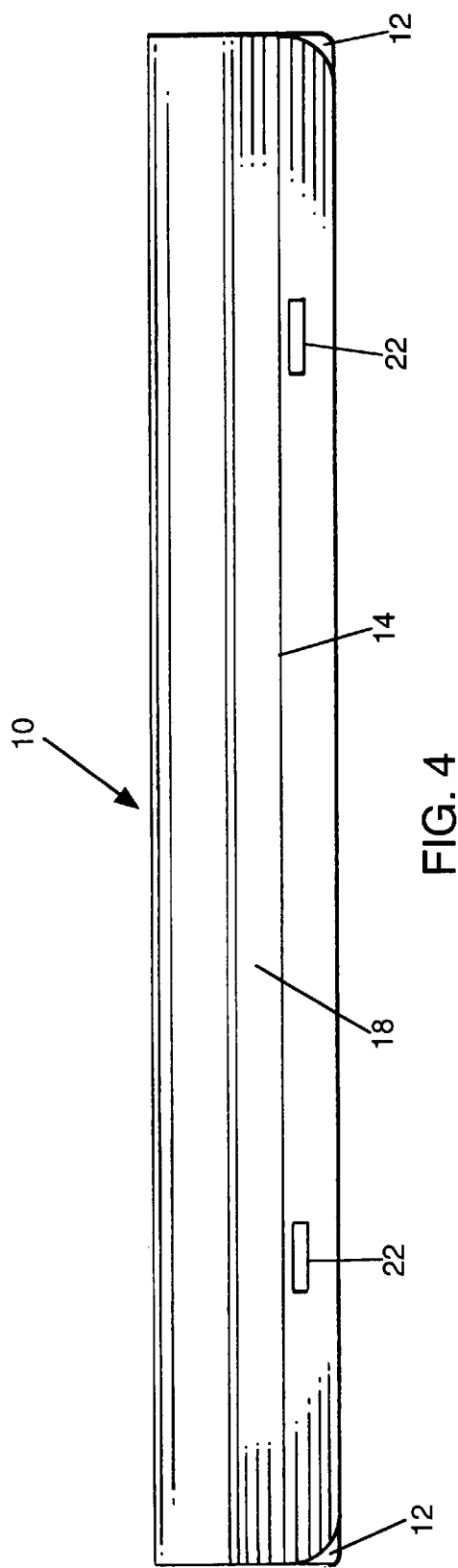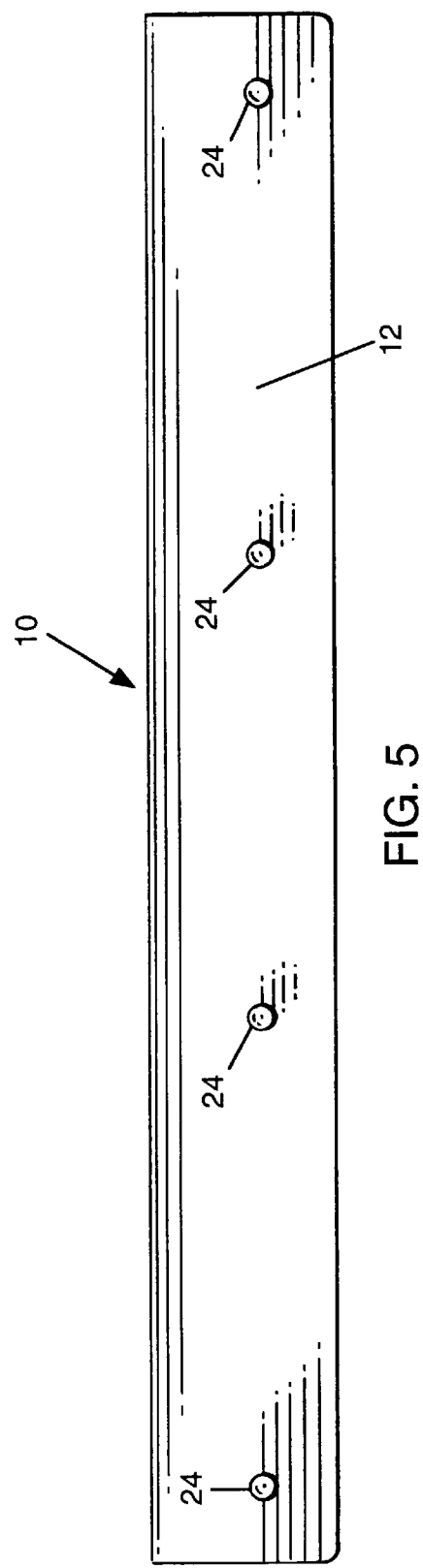

BRACKET FOR MUD FLAPS AND SNOWPLOW DIVERTERS

REFERENCE TO PREVIOUSLY FILED APPLICATIONS

This application is a continuation-in-part of the prior Patent Application of James J. Cominsky, identified by Ser. No. 08/701,784, filed Aug. 26, 1996 now U.S. Pat. No. 5,823,571. Benefit of the filing date for original disclosure material in the parent domestic application is claimed under 35 USC 120 and 37 CFR §1.53.

FIELD OF THE INVENTION

The invention relates to a device to expedite attachment of mud flaps to trucks that prevents damage to the flaps and the retaining device itself. More particularly, the invention is a spring clamp biased for tightly gripping a mud flap adapted to facilitate installation and repositioning of the flaps.

BACKGROUND OF THE INVENTION

Prior art clamps for mud flaps have used fasteners through the flaps themselves for securement to the truck frame. When a flap is caught under truck wheels or torn away, the flap is damaged and reinstallation frequently requires cutting away the damaged portions and reforming the securement means. Consequently, the reconfigured flap may not comply with transportation standards for flap dimension and configuration.

U.S. Pat. No. 3,158,386, to Tillinghast et al., provides a specialized mud flap clamp means for use with a flap specifically formed for cooperation with the clamp.

Likewise, in U.S. Pat. No. 3,219,363, to Dalsey, et al, a mud flap is designed for use with the clamp.

U.S. Pat. No. 3,224,791, issued Dec. 21, 1965 to Sogoian, is a Hanger for Vehicle Splash Guards, having a tubular support member with a central perforation to receive a bolt and a spring member to provide the means by which the hanger is secured to the truck frame.

In further prior art, U.S. Pat. No. 3,778,086, to Moore, et al., describes a hinge portion urged against a base plate by spring and bolt means.

Meanwhile, U.S. Pat. No. 5,487,565, granted Jan. 30, 1996, to Thompson, provides a device to block and divert lateral water spray generated from a vehicle traveling on a wet roadway.

U.S. Pat. No. 5,044,667, granted to Manning on Sep. 3, 1991, is a bracket for mounting a mud flap that has at least one edge whose cross-section is substantially thicker than that of the rest of the mud flap.

U.S. Pat. No. 3,700,260, to Moore et al., granted Oct. 24, 1972, discloses a mounting base plate secured to vehicle, the plate having a hinge with jaw for clamping a mut flap thickened edge portion.

There are many disadvantages of one kind or another as shown in the prior art multi-piece mud flap clamps. Due to these and other disadvantages and limitations, their use has been restricted with only limited market approval and distribution.

These objections can be overcome by the present invention that will be disclosed in the following paragraphs. What is needed is a flap retaining device that has releasability which allows for release of the flap when forced or pulled away from the truck, without damage to the flap or its retention bracket.

SUMMARY OF THE INVENTION

The flap retainer means of the invention is formed by a single, unitary stainless steel piece, comprising a bracket with a flat portion for attachment to, and dependency from, a truck frame by standard fasteners. Before being shaped, the bracket has front and back surfaces. The bracket is bent on itself with the front surface or front portion on the interior or inner side of the bracket. A flat clamp area is formed in the bent portion of the bracket for impingement on the corresponding inner bracket surface, thereby forming a clamp having a mud flap gripping area. And the grip area of the device is bent again, outward from the grip area, to form a leverage strut having pry holes which are adapted for insertion of a screwdriver or other pry instrument.

As such, the screwdriver inserts under the strut into a pry hole and an outward pressure on the screwdriver provides leverage on the strut for opening the clamp by widening the grip area for reinstallation, repositioning and retention of mud flaps within the bracket.

The flat portion includes a series of stud projections for insertion in corresponding holes in the rearward facing, transverse flap frame support of the truck. In an alternate embodiment, the grip area of the flat portion includes a series of nubs or dimples on the inside of the clamp, which project into the grip area to impinge on the flap and enhance frictional retention of the flap. In an additional embodiment for the invention, the grip area on the inside of the flap portion includes one or more lines or striations grooved into the either or both opposed surfaces of the flat portion and the flat clamp area.

In either embodiment, the flap is formed of stainless steel that can be heat treated into spring metal which, in the structure described herein, comprises a spring clamp with sufficient bias for retaining the flap against forces up to the shear strength of the flap itself.

Holes are punched in the outer surface of the flat portion and in the front portion of the bracket for installation of studs which are pressed into and journalled therein to anchor in the back portion. The spring bracket of the invention may be constructed by initially drilling holes in the piece followed by installation of studs therein. But it is preferable to form the piece first followed by drilling to journal the studs therein, so that removal of the piece from the machine is not required for the sequence of machining processes.

In still another embodiment, the spring bracket portion impinges against the corresponding inner bracket surface with a single angular point, thereby forming a clamp having a mud flap gripping point; and, the pry strut then projects outwardly from the spring bracket from that point. This embodiment provides a pair of angled brackets positioned adjacent one another, for gripping a single mudflap. Each of the pair of brackets has each having a pry hole and a flat pry tool receptacle.

A final embodiment provides for attaching the brackets in inverted position to the top perimeter of a snowplow blade. The brackets are attached to the plow by insertion of the bracket studs in corresponding holes provided in the blade. Multiple inverted flap retaining devices are thus used for attaching a snow plow diverter belt to the blade.

It is therefore an object of the present invention to provide a mud flap retainer device that simultaneously provides the characteristics of durability, sufficient spring bias to hold the flaps against the elements and forces against which they are commonly subjected, ease of installation and repositioning of flaps, and releasability on confrontation of superior force, such as impingement of a flap under a truck tire, without destruction to the truck support frame, the flap or its retention device.

Another object is to provide a mud flap retaining device which can be constructed as a one-piece, integral element with reduced manufacturing costs.

Yet another object of the invention is to provide a mud flap retainer with a strut having pry holes to receive a screwdriver or other leverage bar, that enables replacement or repositioning of mud flaps by an operator of the vehicle without training, assistance or specialized equipment.

It is a further object of the invention that the flap which acts as a splash and spray suppressant device in combination with the spring bracket disclosed herein, can be installed, adjusted, removed and replaced without encountering fasteners which may be frozen through corrosion by rust or stripped and jammed.

Still another object that will become apparent through this disclosure, is that a mudguard may be easily aligned and clamped in a desired position relative to wheels of the vehicle for compliance with federal and state safety requirements for wheel protectors.

Other objects and features of this invention will be apparent in part and so indicated hereinafter. Further advantages will be apparent to those of ordinary skill in the art upon reading and understanding the following detailed description.

BRIEF DESCRIPTION OF THE DRAWINGS

FIG. 4 is a front orthogonal of the retaining device;

FIG. 5 is an orthogonal rear view of the device;

DETAILED DESCRIPTION OF THE PREFERRED EMBODIMENT

Figure 1:
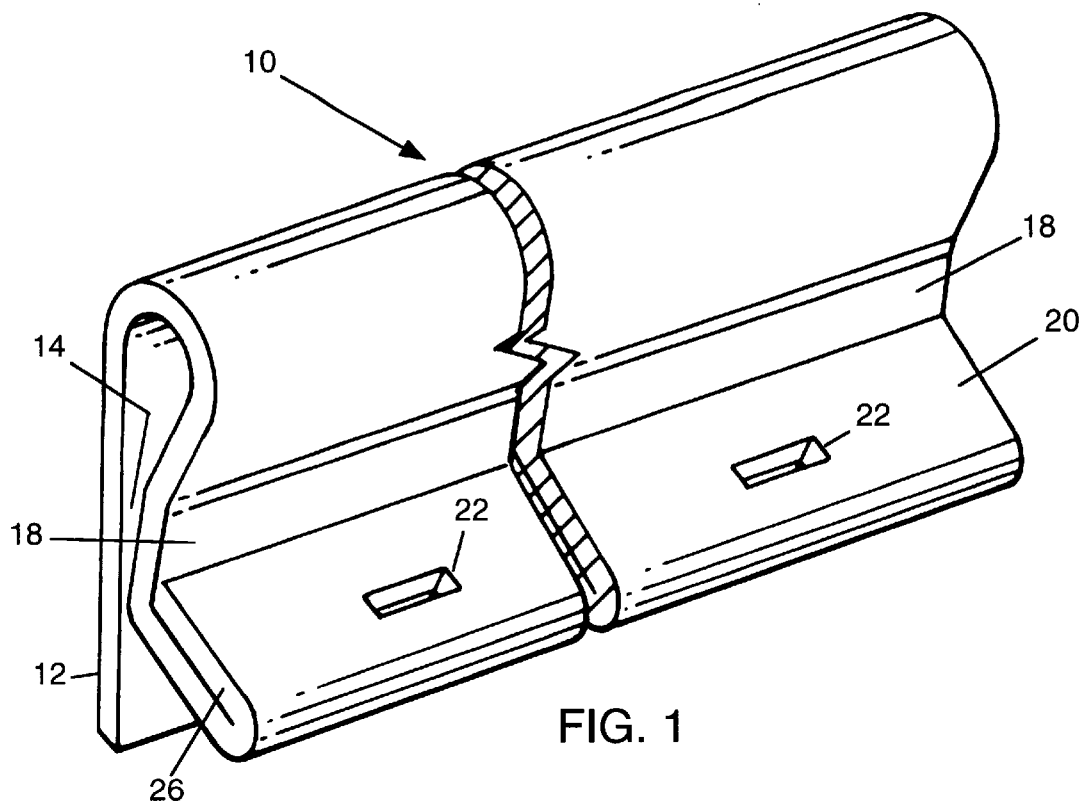
FIG. 1 is front perspective view of the mud flap retaining device of the invention.

The newly designed mud flap retaining device or spring bracket 10 shown in FIG. 1 indicates the flat portion 12 that is adapted for installation on the corresponding truck support frame (not shown). This portion 12 provides a flat clamp area 14 which may include a series of projecting nubs or dimples 16 to provide increased frictional strain on the flap 105 (in FIG. 3) retained therein.

Figure 2:
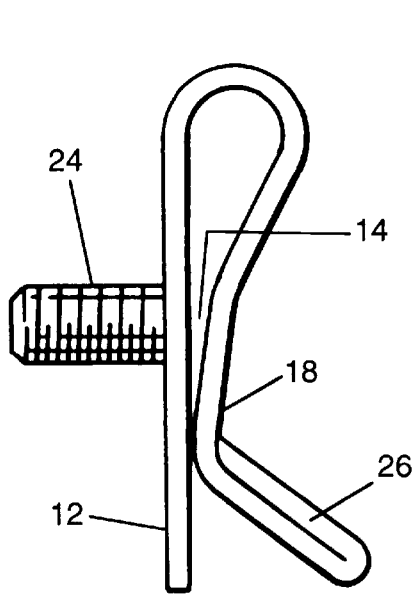
FIG. 2 is a side plan of the retaining device.

Turning to FIG. 2, a side plan of the retaining device 10, the flat portion 12 extends upwardly, whereupon it is bent on itself, and descends down to a pinch or grip area 14 of the spring bracket 10. The flat portion 12 and its opposed spring clip or clamp section 18 are separated by only several thousandths of an inch for sufficient pinch by spring bias and frictional restrain on the mud flap 105 (in FIG. 3).

Figure 3:
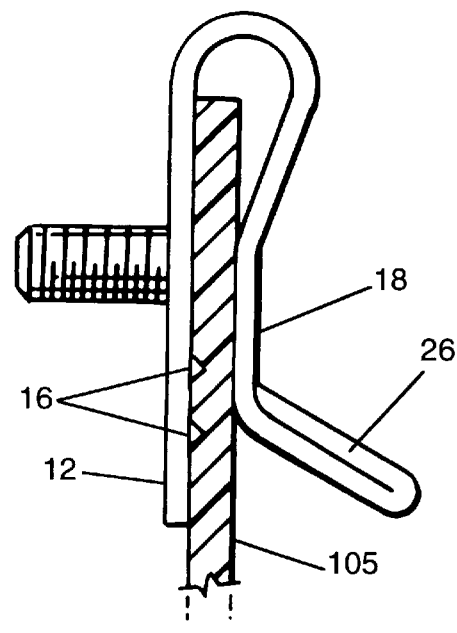
FIG. 3 is a side view of the retaining device operatively clamping a mud flap.

By reference to FIG. 3, a side view of the retaining device operatively clamping a mud flap 105, the spring force or clamp action of the retaining device 10 is designed with sufficient bias to hold the mud flap 105 within the bracket 10 against forces up to the shear strength of the flap itself.

Beyond the clamp area 14, the bracket 10 is bent radially outward from the flat portion 12 to form a strut 20 having pry holes 22 for application of leverage on the strut 20, by inserting a screwdriver (not shown) from under the strut 20, to counteract against the spring bias of the clamp section 18 of the bracket 10 for removal, adjustment or reinstallation of a flap 105 in a one-man operation without requiring assistance or any specialized equipment. It will be understood, by reference to FIG. 4, a front orthogonal of the retaining device, and FIG. 5, an orthogonal rear view of the device, that no bolts, washers or nuts are required for insertion and retention of a flap within the bracket of this invention. Studs 24 which project from the back of the bracket 10 are insertable into the transverse, rearward facing frame support of a truck. Hanging the bracket is an essentially permanent installation with no requirement or necessity for removal of the flap retaining device when installing, changing or adjusting the flaps. Clearly, the invention disclosed here obviates the concomitant inconvenience confronting an operator when such fastener components attendant to prior art brackets become sealed by corrosion.

It will also be apparent that the flap 105 is only releasable from the retaining device 10 on application of an exceptional force, such as when a flap 105 may accidentally be caught under a truck tire (not shown). The flaps themselves will have an extended use due to the releasability feature of my invention. Thus, the flaps, that must comply with transportation safety requirements on installation, may also be enhanced and popularized visual indicia such as company, home base or truck operator logos.

To assure sufficient strength of the strut 20 to act as a leverage bar, a strut fortification extension 26 is preferably formed as an integral component of the strut 20. The strut fortification extension 26 is an integrally extended portion of the strut 20, folded back on itself, for strengthening the strut as a leverage projection when opening the bracket.

Figure 6:
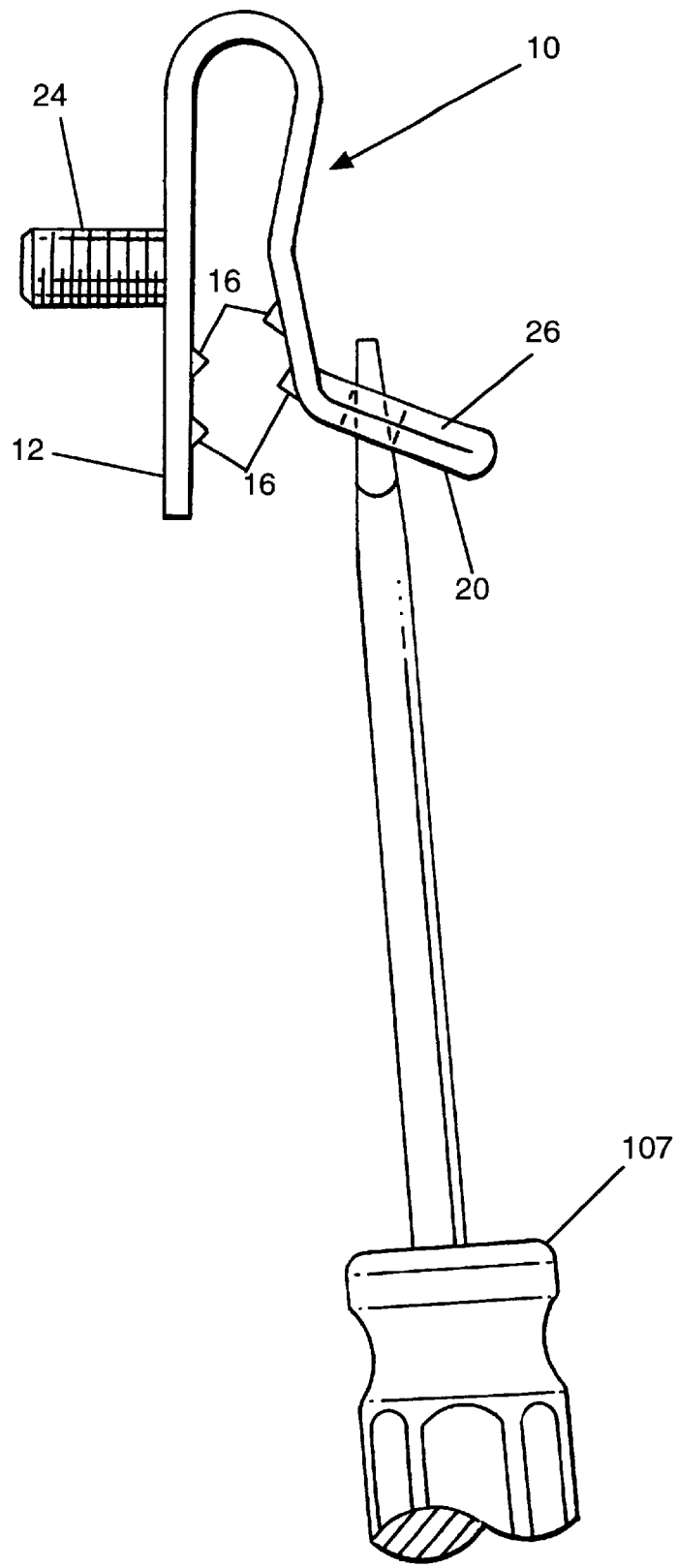
FIG. 6 indicates the spring bracket operatively pried open by leverage of a screwdriver for outward pressure on the strut.

Reference to FIG. 6 indicates that in operation, the spring bracket 10 is pried open by insertion of a screw driver 107 or other pry instrument into a pry hole 22 for outward pressure on the strut 20 and consequent opening of the bracket for insertion, adjustment or removal of a flap. FIG.

Figure 6A:
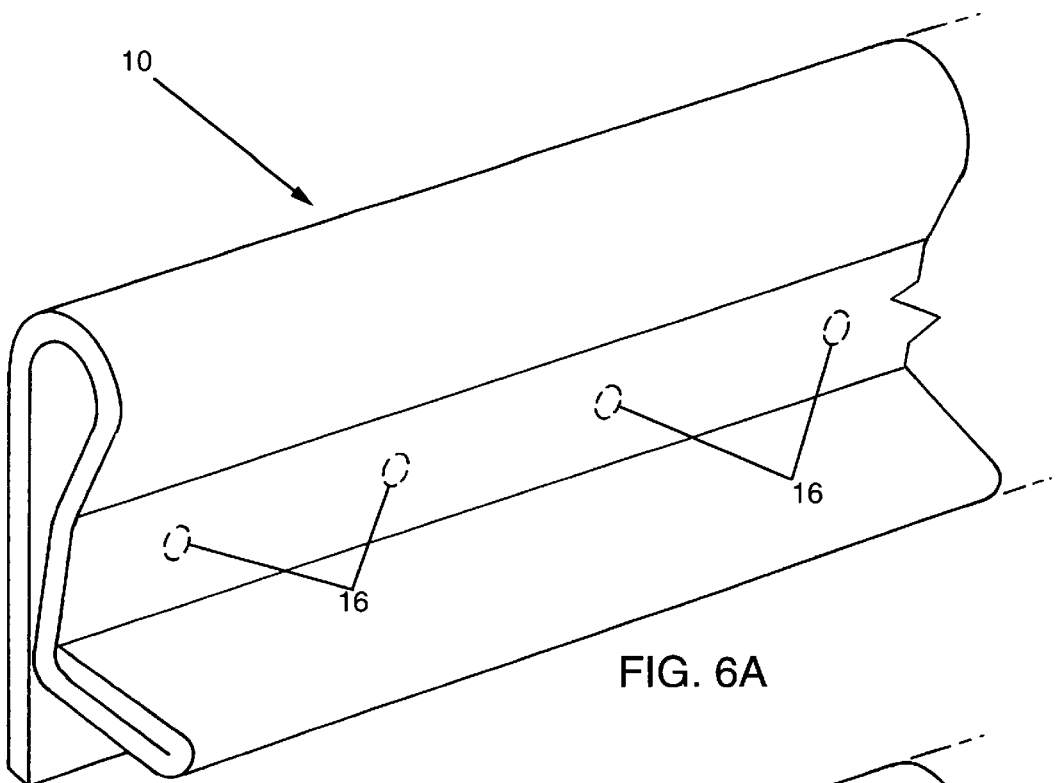
FIG. 6A is a partially cutaway view of the bracket showing nubs shaped like a mound.
Figure 7:
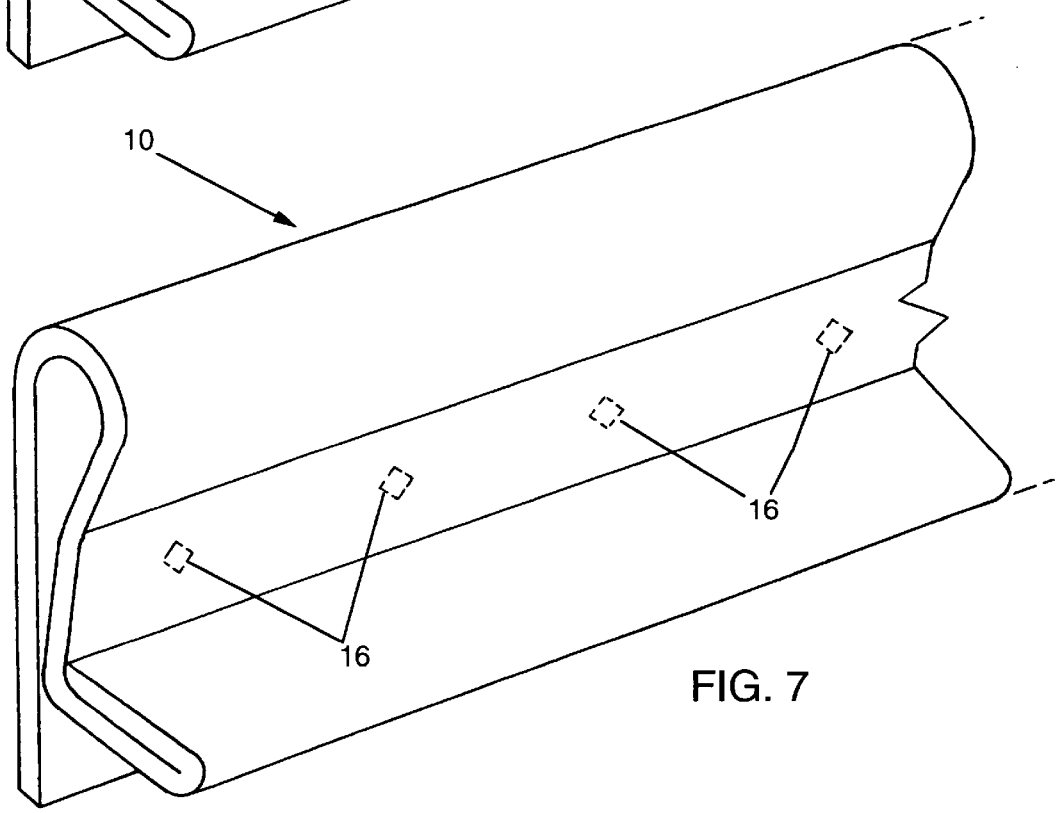
FIG. 7 is a partially cutaway view of the bracket to show the nubs in linear configuration; and, FIG. 7A is a partially cutaway view of the bracket to show the nubs in triangular configuration.
Figure 7A:
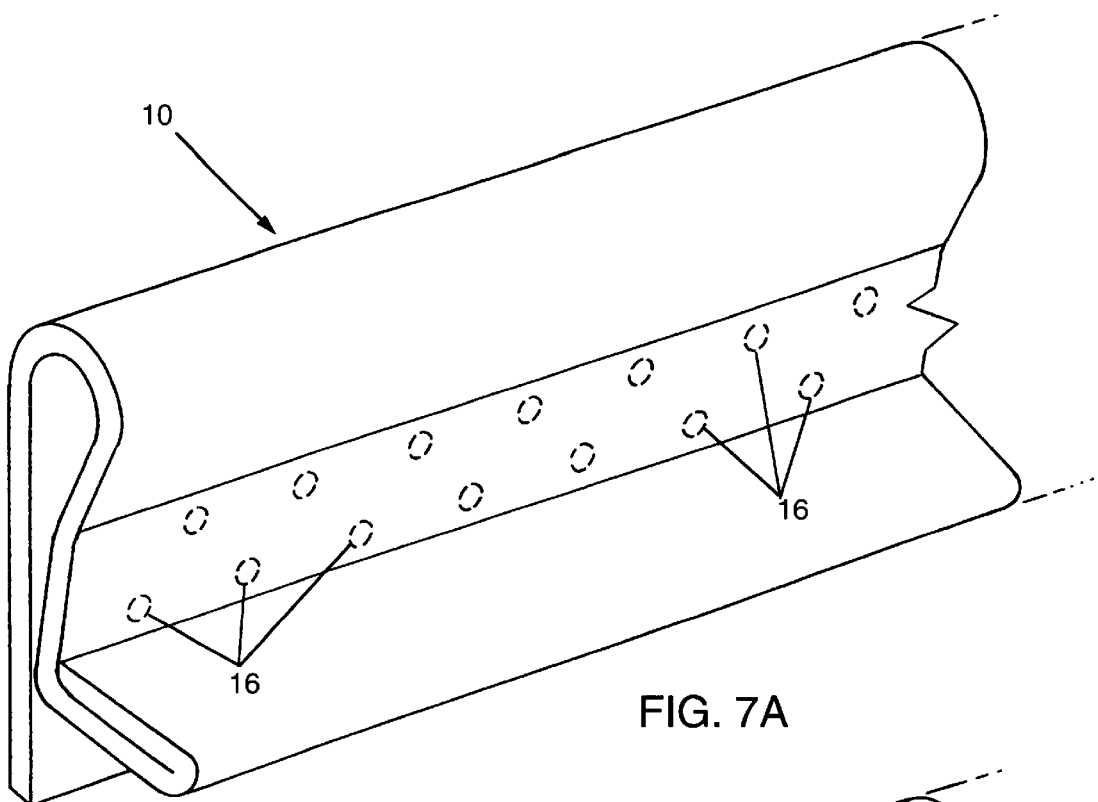
Figure 8:
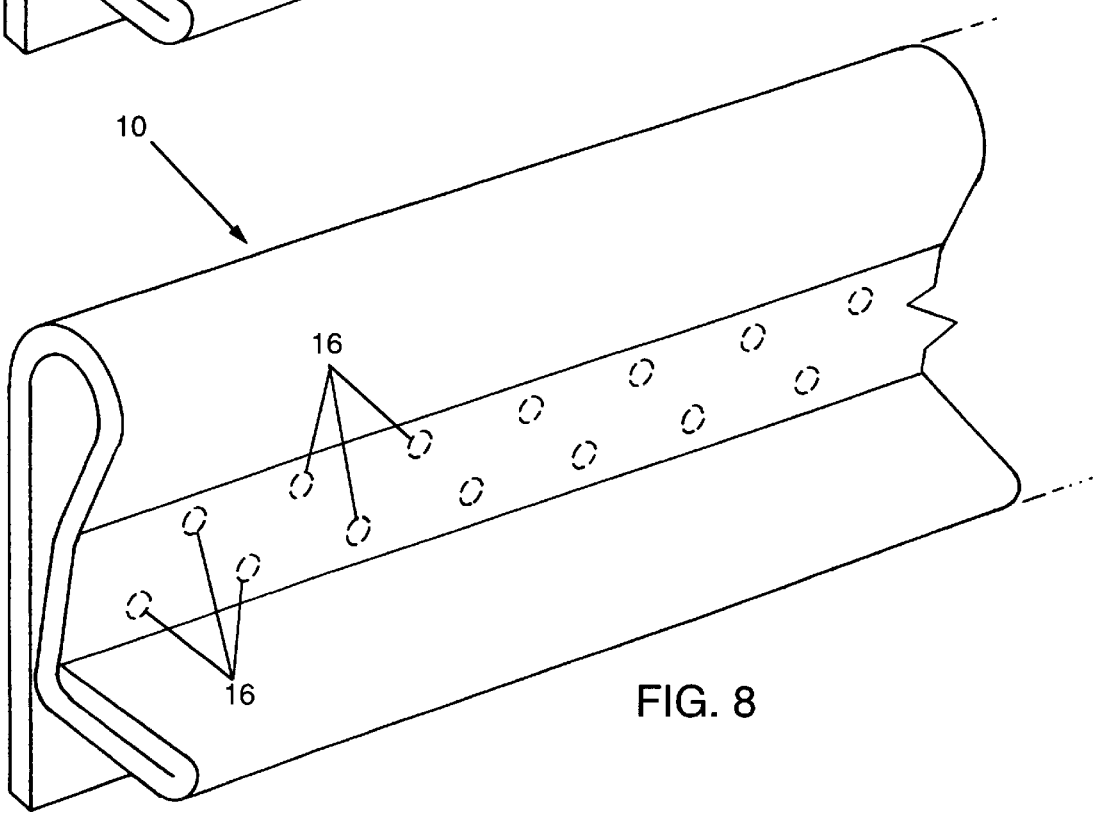
FIG. 8 is a partially cutaway view showing the mound shaped nubs in triangular configurations and positioned alternately on the flat portion and on the clamp section.

6 further indicates that the projecting nubs or dimples 16 may be positioned in alternating configuration on both the flat portion 12 and on the clamp section 18. In a further refinement to enhance grip action without diminishing releasability characteristics of the bracket 10, the nubs 16 may have a pyramidal shape with an opposed interlock array as in shown in FIG. 6; or the nubs 16 may be shaped as rounded hillocks or mounds and be aligned in a linear array as in FIG. 6A. Other alternatives provide for the nubs 16 to have the pyramid shape and to be in a linear configuration as in FIG. 7; or the nubs 16 may be positioned in a triangular configurations as shown in FIG. 7A. Other alternatives provide for the nubs 16 to be either pyramid shaped or mound shaped, arrayed in triangular configurations, and positioned alternately on the flat portion and on the clamp section as shown in FIG. 8. Meanwhile, the nubs 16 may be formed of bracket material and integrally formed with the retaining device 10 by stamping the nubs in the pyramid or mound shapes; or alternatively, the nubs may be individual plastic or rubber pieces that are fixed by adhesives to the flat portion 12 and/or clamp section 18.

Figure 9:
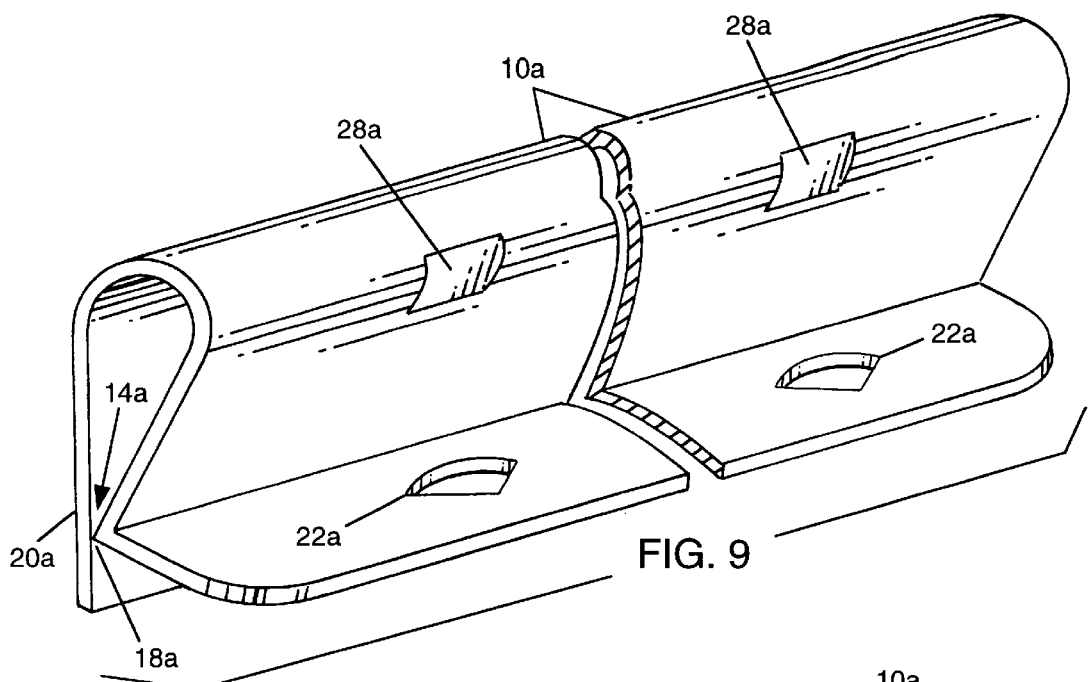
FIG. 9 is a front perspective view showing a pair of angled brackets for gripping a single mudflap.
Figure 10:
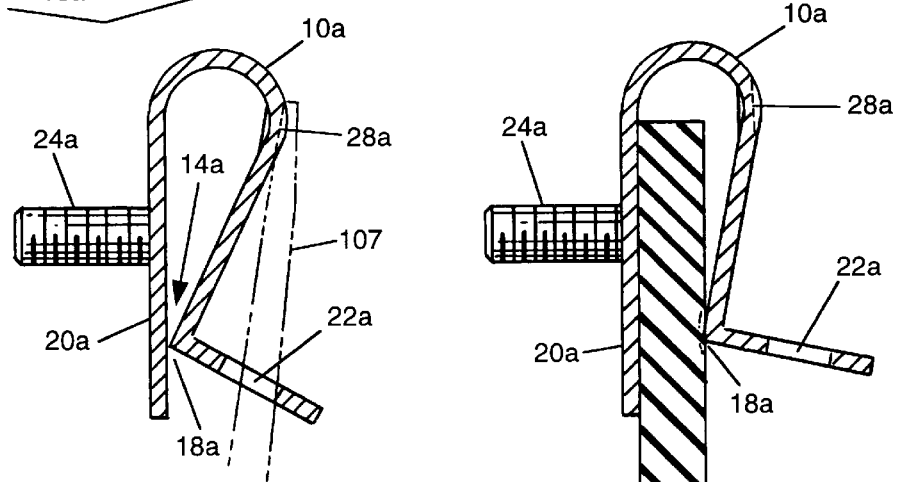
FIG. 10 is sectional end view of the bracket having an angled clamp with a single point of impingement on the flat section and strut formed as a single piece without fortification.
Figure 11:
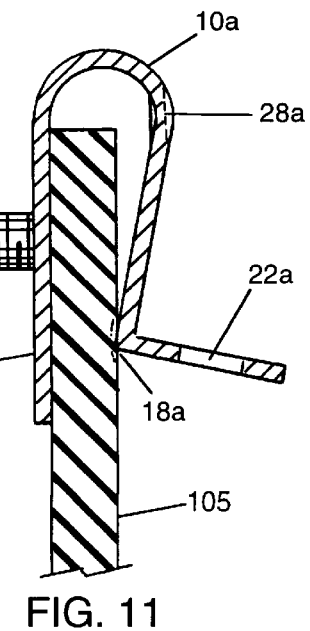
FIG. 11 is an end view of the bracket showing the angled clamp retaining a mud flap with a single point of impingement and the strut formed as a single piece without fortification.
Figure 13:
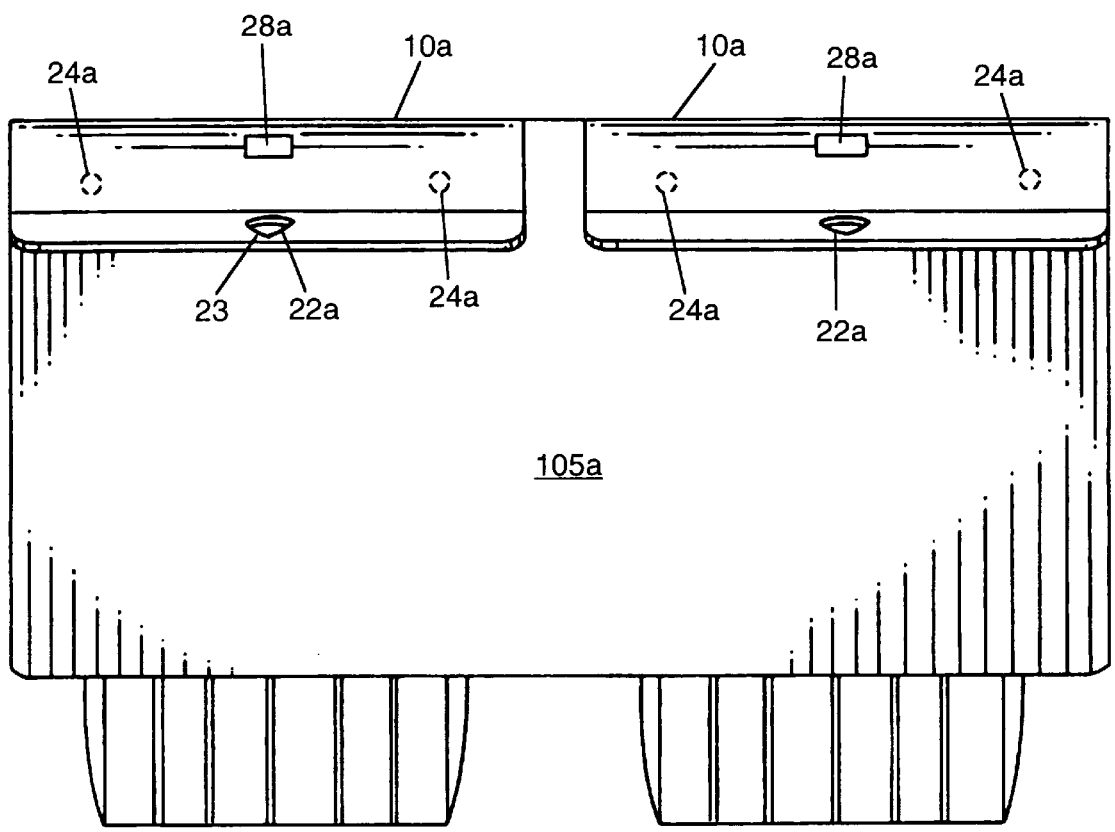
FIG. 13 is a front view of dual clamp devices with clamped mud flap at the rear of a vehicle.

Referring now to FIGS. 9 and 13, two brackets 10*a* serve as dual clamp devices for clamping a single mud flap at the rear of a vehicle. Removal, replacement, straightening, rotation and reinstallation of mud flaps is facilitated by teardrop shaped pryhole 22*a* and pry tool receptacle 28*a*.

In this embodiment for the invention as shown in FIGS. 9–12, the clamp section 18*a* of bracket 10*a* is formed with a sharp angle, whereby the strut 10*a* impinges the mud flap at a single point and then projects straight outward and away from the flat portion 20*a* and the clamp area 14*a*. Whereas the first embodiment for the invention would more suitable for rubber mud flaps 105, this newer embodiment is preferable for use with vinyl or other plastic flaps 105*a*.

Figure 12:
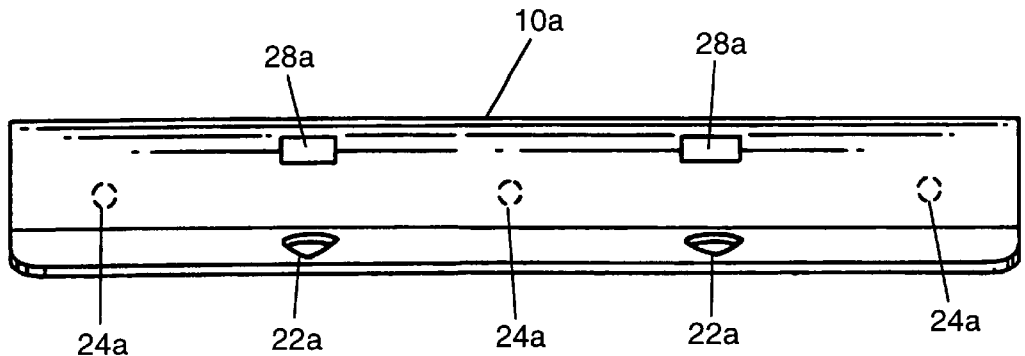
FIG. 12 is a front view of the retaining device that shows an oval portion at the bottom of the pry tool receptacle and the recessed area for holding the pry tool true as pressure is exerted for opening the bracket.

As shown in FIG. 12, the pry tool receptacle 22*a* with an angular bottom portion 23, serves to hold the pry tool in a position of maximum leverage. The recessed area 28*a* serves as a receptacle and another means for retaining the pry tool in a straight or true position for application of an even pressure on both sides of the pry hole 22*a*.

In FIG. 13, two brackets serve as dual clamp devices for clamping a single mud flap at the rear of a vehicle. Removal, replacement, straightening, rotation and reinstallation of mud flaps is facilitated by teardrop shaped pryhole 22A and pry tool receptacle 24.

Figure 14:
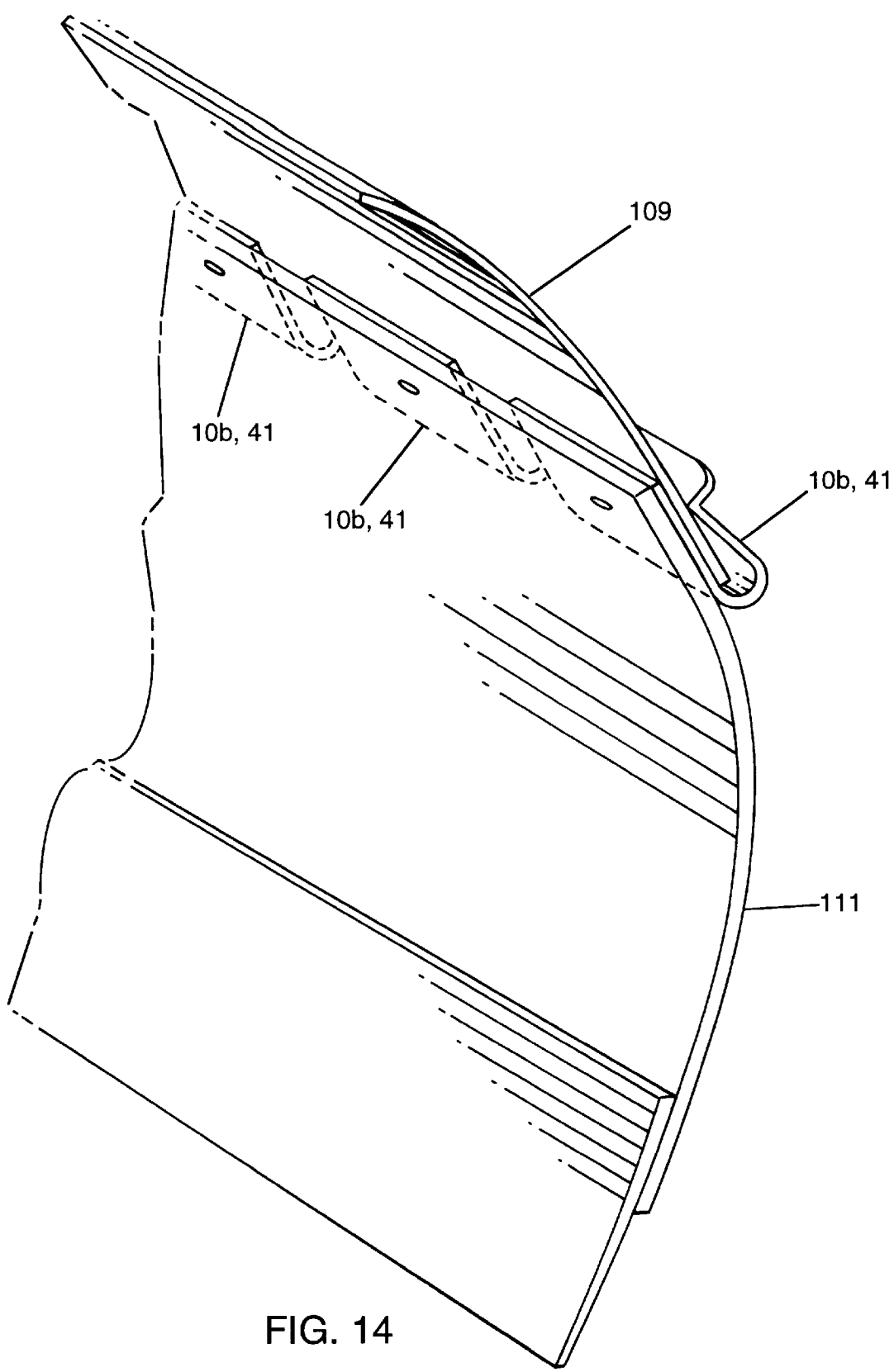
FIG. 14 is a perspective view of an alternate embodiment showing multiple inverted flap retaining devices attaching a snow plow diverter belt.

FIG. 14 is a perspective view of an alternate embodiment showing multiple inverted flap retaining devices attaching a snow plow diverter belt.

Changes and modifications can be made by those skilled in the art without departing from the spirit of the present invention. The preceding detailed description should be considered exemplary in nature and not limited to the scope and spirit of the invention as set forth in the appended claims.

What is claimed is:

1. A mudflap retainer for attachment to a transverse, rearward facing support frame of a truck, comprising:

a pair of brackets positioned adjacent one another, each having a flat portion mounted on a truck support frame to depend from the frame, a spring bias clamp section formed by an arch of the flat portion bent on itself in the arch to form the spring bias clamp for clamping a mudflap against the flat portion of each bracket, a retainer clamp section extending from the spring bias clamp section of the arch to form a grip area of the bracket, the grip area attenuating a space between the flat portion and the clamp section, and a leverage strut formed by an extension of the retainer clamp section bent radially outward from the clamp section near the grip area, for opening the retainer device by applying a force on the strut;

a means for mounting each bracket of the pair on the frame.

2. The mudflap retainer of claim 1, wherein the means for mounting each bracket comprises an at least one stud projecting from the back of each bracket for insertion into a traverse, rearward facing frame support of a truck.

3. The mudflap retainer of claim 2, wherein each bracket of the pair comprising a ferrous material is formed by the steps of heat treating the ferrous material to form a spring bracket of the pair, drilling an at least one hole in the flat portion of each bracket, and journalling the at least one stud in said at least one hole, thereby obviating removal of each bracket from a machine during the machining process.

4. The mudflap retainer according to claim 3, wherein the grip area of each bracket comprises an angular point that impinges against the corresponding inner surface in each bracket thereby forming a mudflap gripping point in each bracket.

5. The mudflap retainer of claim 4, each bracket of the pair further comprising a hole through the strut of each bracket to form a pry tool receptacle, for leveraging the strut to open the clamp.

6. The mudflap retainer of claim 5, wherein the pry tool receptacle has an essentially oval shape to guide the pry tool and maximize leverage on the strut.

7. The mudflap retainer of claim 6, further comprising a recessed receptacle area above the pry tool receptacle of each bracket to serve as a further means for directing the pry tool in a straight or true position for application of an even pressure to open the bracket.

\* \* \* \* \*